No. 813,689. PATENTED FEB. 27, 1906.
W. H. BRISTOL.
INDICATING AND RECORDING DEVICE.
APPLICATION FILED MAY 6, 1905.
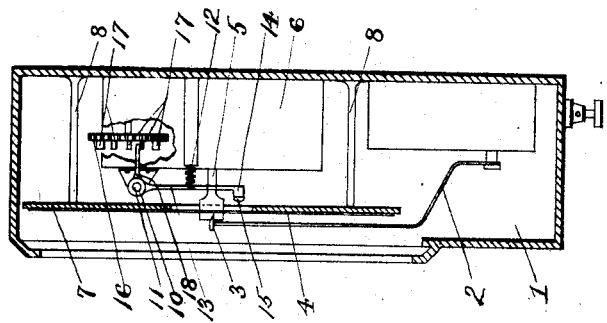
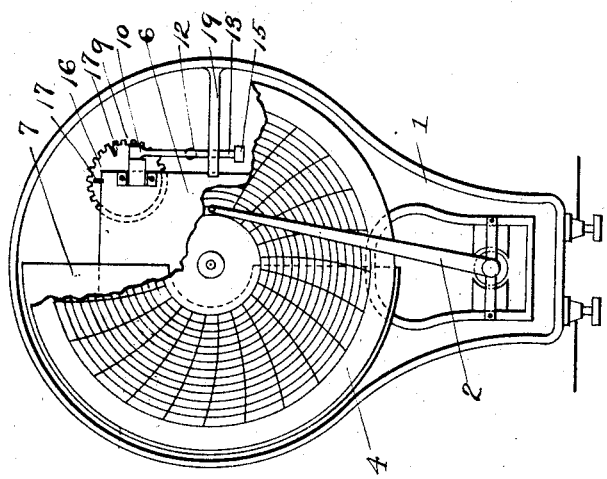
Witnesses
H. Baker
Raena N. Judifky.
William H. Bristol Inventor
By His Attorney Fred F. Schuck

UNITED STATES PATENT OFFICE.

WILLIAM H. BRISTOL, OF NEW YORK, N. Y.

INDICATING AND RECORDING DEVICE.

No. 813,689.  Specification of Letters Patent.  Patented Feb. 27, 1906.

Application filed May 6, 1905. Serial No. 259,155.

*To all whom it may concern:*

Be it known that I, WILLIAM H. BRISTOL, a citizen of the United States, and a resident of New York city, in the county of New York and State of New York, have invented certain new and useful Improvements in Indicating and Recording Devices, of which the following is a specification.

My invention relates to means for rendering indicating and recording devices extremely sensitive and accurate, and especially to certain means whereby I am able to directly record the movements of an indicating-arm the actuating force of which is insufficient to make direct records by the usual methods, all intermediate mechanism, such as relays, &c., being dispensed with.

For this purpose my invention consists, essentially, of an indicating and recording device having an indicating-arm adapted to move over an unsupported portion of a chart, means to rotate said chart, and means to independently vibrate said chart or said indicating-arm.

The nature of my invention will best be understood when described in connection with the accompanying drawings, in which—

Figure 1 is an elevation of a device for indicating and recording electrical pressures or currents and changes therein, showing the cover removed and a portion of the chart broken away. Fig. 2 is an end view of the device, partly in section.

Similar numerals of reference designate corresponding parts throughout both views.

Referring now to the drawings, 1 represents a voltmeter or ammeter of the standard type having the usual recording elements— viz., an indicating-arm 2, preferably flattened and provided with a marking-point 3, and a chart 4, such as the smoked chart disclosed in my prior patent, No. 748,918, of January 5, 1904. The chart 4 is mounted to rotate with the spindle 5, actuated by the clock mechanism 6, and is backed for about one-half its surface by a segmental plate 7, connected to the casing of the meter by the pins 8. A portion of the chart 4 in the vicinity of the indicating-arm is thus left perfectly free to vibrate.

9 is a vibrating mechanism to vibrate the portion of the chart 4 over which the arm 2 acts. It consists, essentially, of the bell-crank 10, mounted upon the shaft 11 and held in position by the spring 12, which also serves to vibrate the arm 13 of the bell-crank. At the extremity of the arm 13 is a suitable weight 14 to store the energy and is capped with a felt pad 15. Upon the wheel 16 of the clock mechanism 6 I provide a number of vertical pins or blocks 17 and so arrange them that they will periodically wipe the arm 18 of the bell-crank 10 as the wheel 16 of the clock mechanism revolves. As the wheel 16 revolves the arm 18 of the bell-crank will be forced backward in opposition to the spring 12 by the pins or blocks 17 and when released will be caused to vibrate by the spring 12. The pad 15 on the arm 13 of the bell-crank is thereby caused to strike the chart 4 and to transmit the vibration of the bell-crank to it. A flattened strip 19, attached to the casing, extends partly over the vibrating portion of the chart 4 and serves to limit the vibration of said chart.

The arm 2 is so adjusted that the marking-point 3 is close to the chart 4, and only a slight vibration of the latter is therefore necessary to make contact and produce the record upon the chart. The chart 4 may of course be of the ordinary type adapted to be marked by ink held within the marking-point of the indicating-arm. For extremely delicate measurements I prefer, however, to use the smoked chart and a non-inking marking-point, the point simply serving to remove a small portion of the carbon whenever it comes into contact with the chart. I may also cause the indicating-arm to vibrate instead of the chart by very slightly tapping the former by similar mechanism. I prefer, however, to vibrate the chart or a small portion of the chart in vicinity of the marking-point, thereby reducing the stress on the delicate bearings to a minimum. I do not wish to restrict myself to the particular means of vibration shown, as the vibrating mechanism may be operated by an independent clock mechanism, by magnetic means, or the chart vibrated directly by pneumatic means, &c. By thus vibrating either chart or indicating-arm the vibration is more or less communicated from one to the other, and a series of dots is formed upon the chart, producing a practically continuous line and record of the movement of the arm. A practically continuous vibration may be obtained by the proper arrangement of the pins or blocks 17 upon the wheel 16.

I am aware that attempts have been made to record the duration of motion or rest of a vehicle by the vibration of an arm which received its vibration from the jarring of the vehicle to which it is attached; but I definitely vibrate one of the recording elements independently of the entire instrument and vibrate it whether the support of the instrument is in motion or not.

In preventing contact of the arm with the chart except during momentary periods practically all friction between the arm and chart is eliminated, the friction being only instantaneous. The arm therefore has the greatest possible freedom of motion, and the device is rendered most accurate and capable of extreme sensitiveness, allowing of the recording of the movements of the arm without any intermediate mechanism, even though the force actuating the arm be extremely weak.

What I claim as my invention, and desire to secure by Letters Patent, is—

1. In an indicating and recording device, a combined indicating and recording arm, a chart backed or supported over only a portion thereof, the active or unsupported portion being left perfectly free to vibrate whereby the impact between the recording elements is gradually taken up, and means to cause transverse vibrations of one of the recording elements at said active or unsupported portion.

2. In an indicating and recording device, a combined indicating and recording arm, a chart backed or supported over only a portion thereof, the active or unsupported portion being left perfectly free to vibrate whereby the impact between the recording elements is gradually taken up, and means to periodically cause transverse vibrations of one of the recording elements at said active or unsupported portion.

3. In an indicating and recording device, an indicating-arm, a chart backed or supported over only a portion thereof, the active or unsupported portion being left perfectly free to vibrate whereby the impact between the recording elements is gradually taken up and means to independently vibrate said chart at said active or unsupported portion.

4. In an indicating and recording device, an indicating-arm, a chart backed or supported over only a portion thereof, the active or unsupported portion being left perfectly free to vibrate whereby the impact between the recording elements is gradually taken up and means to periodically vibrate said chart at said active or unsupported portion.

5. In an indicating and recording device, an indicating-arm, a smoked chart backed or supported over only a portion thereof, the active or unsupported portion being left perfectly free to vibrate whereby the impact between the recording elements is gradually taken up and means to independently vibrate said chart at said active or unsupported portion.

6. In an indicating and recording device, a flattened indicating-arm, a revoluble chart backed or supported over only a portion thereof, the active or unsupported portion being left perfectly free to vibrate whereby the impact between the indicating elements is gradually taken up and means to independently vibrate said chart at said active or unsupported portion.

7. In an indicating and recording device, a flattened indicating-arm provided with a marking-point, a smoked revoluble chart unsupported over its active portion, clock mechanism, a bell-crank, and means in connection with said clock mechanism to vibrate said bell-crank, and means connected to the bell-crank to vibrate said active portions.

8. In an indicating and recording device, an indicating-arm, a chart backed and supported over substantially one-half its surface by a plate, the active portion being unsupported and free to vibrate, clock mechanism to revolve said chart, a bell-crank held in position by a spring, pins or blocks mounted upon a wheel of said clock mechanism and adapted to wipe one arm of said bell-crank causing it to thereby vibrate said chart.

9. In an indicating and recording device, a chart unsupported over its active portion, means to vibrate the active portion of said chart and means to limit the vibration of said active portion of the chart.

Signed at New York, in the county of New York and State of New York, this 4th day of May, 1905.

WILLIAM H. BRISTOL.

Witnesses:
FREDK. F. SCHUETZ,
ROEN H. YUDIZKY.